United States Patent [19]

Torberg

[11] Patent Number: 4,757,630
[45] Date of Patent: Jul. 19, 1988

[54] ANCHORING MECHANISM FOR DECOYS AND FLOATING ARTICLES OF THE LIKE

[76] Inventor: Richard L. Torberg, 3607 Steele St., Minnetonka, Minn. 55345

[21] Appl. No.: 893,398

[22] Filed: Aug. 5, 1986

[51] Int. Cl.⁴ ............................................. A01M 31/06
[52] U.S. Cl. ........................................................ 43/3
[58] Field of Search .................. 43/3, 2; 446/160, 153

[56] References Cited

U.S. PATENT DOCUMENTS

| | | | |
|---|---|---|---|
| 1,789,649 | 1/1931 | Gazecki et al. | 43/3 |
| 1,951,429 | 3/1934 | Massie | 43/3 |
| 2,747,814 | 5/1956 | Taylor | 43/3 |
| 2,917,857 | 12/1959 | Musznski | 43/3 |
| 3,733,733 | 5/1973 | Ruter | 43/3 |
| 4,340,192 | 7/1982 | Burris, III | 43/3 |

Primary Examiner—Nicholas P. Godici
Assistant Examiner—Karen Skillman

[57] ABSTRACT

A decoy anchoring mechanism with a detachable reel and weighted handle is mounted vertically under the keel of a decoy using a pivoting cam and clamp assembly. The reel will automatically play out only enough line to set the anchor, and will permit the decoy to rise and fall naturally on the waves without significant drifting.

8 Claims, 3 Drawing Sheets

ANCHORING MECHANISM FOR DECOYS AND FLOATING ARTICLES OF THE LIKE

BACKGROUND OF THE INVENTION

Hunters have for decades used strings of floating decoys to lure waterfowl within shooting range, or dropped marker buoys at their favorite fishing spots with hopes of later returning to find the same successful fishing. Hunters and fishermen have also discovered that the intrinsic advantages of pursuing their quarry in the early morning or late evening hours have led them to embark well before the light of dawn and return to shore after nightfall. They are, therefore, mindful of the problems and inconveniences associated with attempting to quickly sort, deploy, retrieve, and stow their equipment without fuss or tangling while hampered by poor visibility.

One object of this invention is to fashion a detachable anchoring mechanism for duck decoys which may be quickly and easily attached and detached, thereby avoiding many of the complications attendant existing anchored decoy designs.

A further object of this invention is to construct an anchoring mechanism which will self-right overturned decoys and automatically play out only enough anchoring line to firmly anchor the decoy, but not allow excess line to be fed out permitting the decoy to drift off.

Another object of this invention is to permit that anchoring system to operate in a manner which will firmly anchor the decoy but not impede or detract from its realistic and natural appearance as it floats on the water, rising and falling due to wave action.

An additional object of this invention is to devise an anchoring mechanism that may be used interchangably with decoys, marker buoys, or any other floating articles.

A final object of this invention is to design a decoy with the stated advantages which requires a minimum of moving parts or mechanical components, and which will be easy and economical to manufacture.

U.S. Pat. Nos. 2,917,857 and 3,059,368 disclose decoys capable of quacking or simulating the swimming and feeding mannerisms of a duck or similar waterfowl. Each decoy accomplishes its objective by using mechanical devices employing weight, gears, and human or wave power. The decoy of U.S. Pat. No. 2,917,857 also incorporates an anchoring weight and a reel for the anchor line located inside the decoy.

Other line-and-reel anchoring systems have been disclosed in various U.S. patents, including those of U.S. Pat. Nos. 1,789,649 and 1,951,429. The common characteristic of these structures is their placement of an anchoring line reel within a cavity inside the decoy. U.S. Pat. No. 1,789,649 employs a detent and gear to prevent the reel from rotating and playing out line after it has been set, and uses an enlarged nib and spring clip to hold the anchor. U.S. Pat. No. 1,951,429 places an additional cavity within the tail of the decoy to house the anchor when not in use, and uses a friction disk held in place by a locking screw to prevent the reel from rotating.

U.S. Pat. No. 1,951,424 uses gravity to hold a floating plate equipped with a detent against the reel body to prevent line slippage, and a set of spring-loaded jaws to hold the anchor when not in use. The mechanism is retained in a thin box laid horizontally against the bottom of the decoy.

U.S. Pat. No. 4,340,192 discloses a reel hung inside the body of a decoy, with a ratchet-like locking system of notches to engage a locking pin, which also serves as the release lever and line guide.

While each of these inventions has added some new element to the prior art, there remain shortcomings which these designs do not overcome and which are even exacerbated by the known devices.

Hunters commonly arrive at a deployment site with decoy anchoring lines poorly wound or snarled and tangled because most decoys have poor anchor line storage arrangements. It is often necessary while deploying a string of decoys for hunters to first throw the decoys from their boat to clear tangled decoy lines. This often results in some overturned decoys, and the hunter must row back along the string to right the capsized decoys. If each decoy is to be anchored individually so as to keep them in a particular pattern, it is even more difficult to deploy a series of anchored decoys by throwing them without further entangling the various adjacent lines. Individual anchoring systems generally require the hunter to stop at each location and set the proper anchor line length. If the decoy were instead tossed out of the boat, the anchoring reels inside the presently known decoys would make them top-heavy and likely to capsize, and the locking mechanism would likely release and allow the decoy to drift.

Hunters returning to shore late at night will often bundle their personal belongings together to take indoors with them, but leave items such as decoys, camouflage and oars in the boat for the next morning. It is also common during the late autumn hunting season for overnight temperatures to drop well below freezing, and hunters arrive at their boats in the morning to find the anchoring lines and mechanisms on their decoys frozen solid. The hunters must then carry the entire string of decoys indoors to thaw.

Another shortcoming is that once the presently known decoys are in place, they are tethered to their anchor by a fixed length of line. While a living duck would swim along the water's surface, briefly rising and falling with the waves, a decoy, due to the weight of the anchor and the fixed length of anchor line, will bob unnaturally below the surface of the water as waves pass, thus betraying itself.

If the anchor should become tangled on the lakebed to the point where it cannot be forceably pulled loose, the hunter must reach underwater to find the decoy and its reel mechanism and release it. This presents both a major inconvenience and a potential danger in cold weather or an unstable boat.

In many of the designs, the reel mechanism cannot be detached from the decoy to allow reeling in of the anchor line, cleaning the line, or separately storing the decoy. If a snarl develops in the line, the hunter must fumble with both the decoy and the reel mechanism to retrieve the anchor line. The addition of detents, notches, springs, and grooves in the prior art structures only increases the number of problems that can befall the anchoring mechanism or cause tangling of the line.

The unique anchoring mechanism of this invention disposes of these problems and inconveniences. Furthermore, it employs less moving components and complex mechanical devices, may be manufactured and assembled more easily and economically, and may be used with a variety of floating articles such as marker buoys and the like.

SUMMARY OF THE INVENTION

The decoy anchoring mechanism of this invention utilizes a detachable reel of anchoring line mounted vertically under a decoy using a pivoting cam and clamp mechanism.

A weighted handle on the reel for rewinding the anchor line permits small rotary oscillations of the reel as the decoy rises and falls on waves, but does not allow excess anchoring line to be played out nor the decoy to drift. This prevents the decoy from bobbing under the surface of the water, and enhances its realisitc and natural appearance. The weighted handle also permits the decoy to be thrown into the water, automatically playing out only enough line for the anchor to settle on the lakebed.

The anchoring mechanism is suspended below the decoy from a keel, so that when the decoy is thrown into the water and capsizes, the weight of the anchoring mechanism will right the decoy. The pivoting cam and clamp mechanism, and the reel itself, may be mounted parallel or perpendicular to the axis of the decoy and will additionally act as keel extensions to give the decoy further stability.

The entire anchoring mechanism may be quickly and simply attached to or detached from the keel of the decoy using the pivoting cam and clamp mechanism. This allows the anchoring mechanisms to be disconnected from the decoys for reeling in line or untangling snarls without having to handle the bulky decoys, and allows the anchoring mechanisms to be brought indoors to prevent freezing or permit thawing of frozen anchor lines left outdoors overnight. The reel may also be detached from the decoy mounting assembly to be used with other floating articles such as marker buoys.

An anchor shroud on the anchoring line is attached to the anchor and prevents it from becoming tangled in weeds and debris on the lakebed. The anchor shroud is formed so that is may be snapped into a recess in the reel housing to secure the anchor when not in use.

These and other objects and advantages of the invention will appear more fully from the following description made in conjunction with the accompanying drawings wherein like reference characters refer to the same or similar parts throughout the several views.

DESCRIPTION OF THE PREFERRED EMBODIMENT

Figure 1:
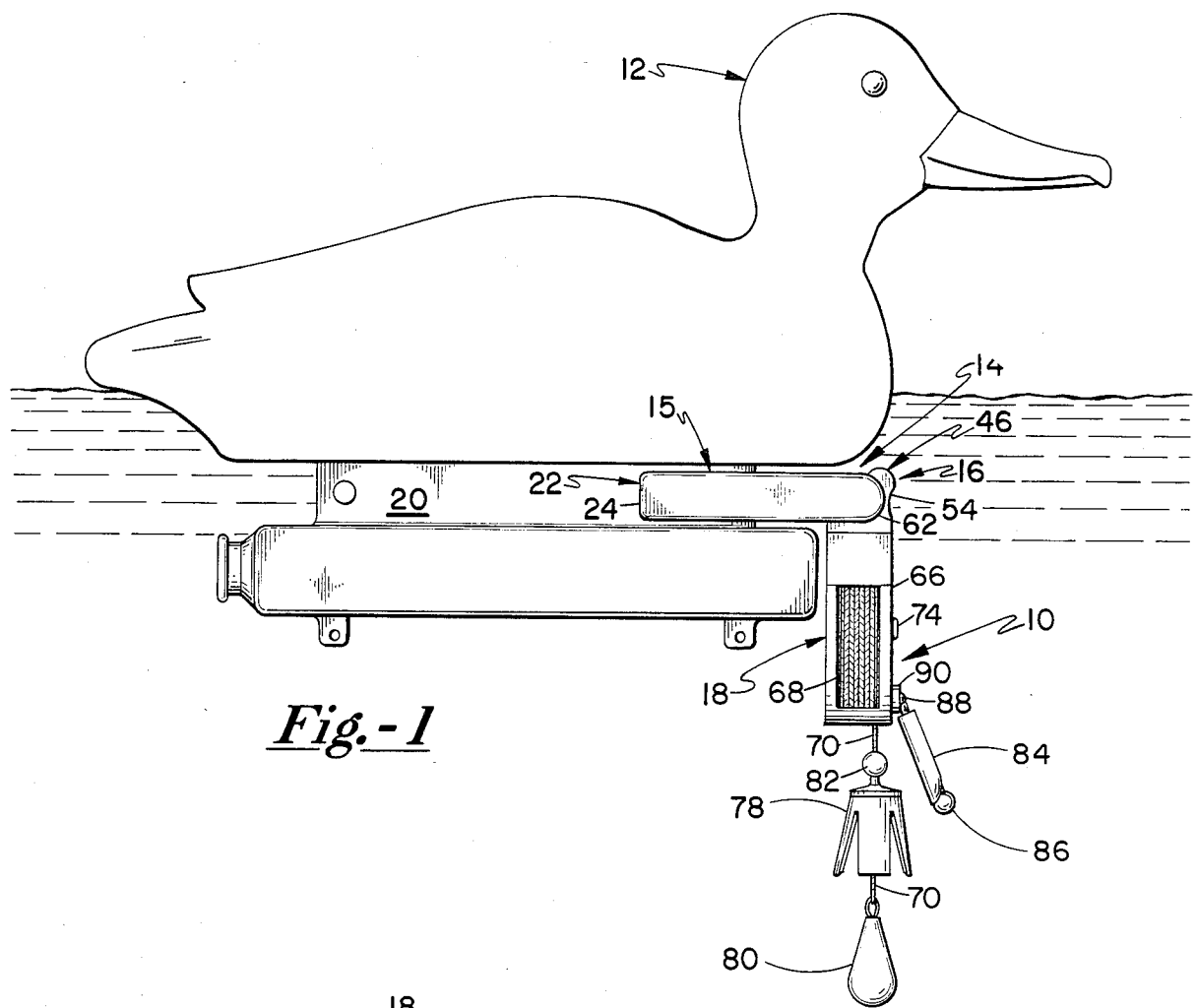
FIG. 1 is an oblique view of a duck decoy floating in water, with the anchoring mechanism of this invention mounted below the decoy.
Figure 2:
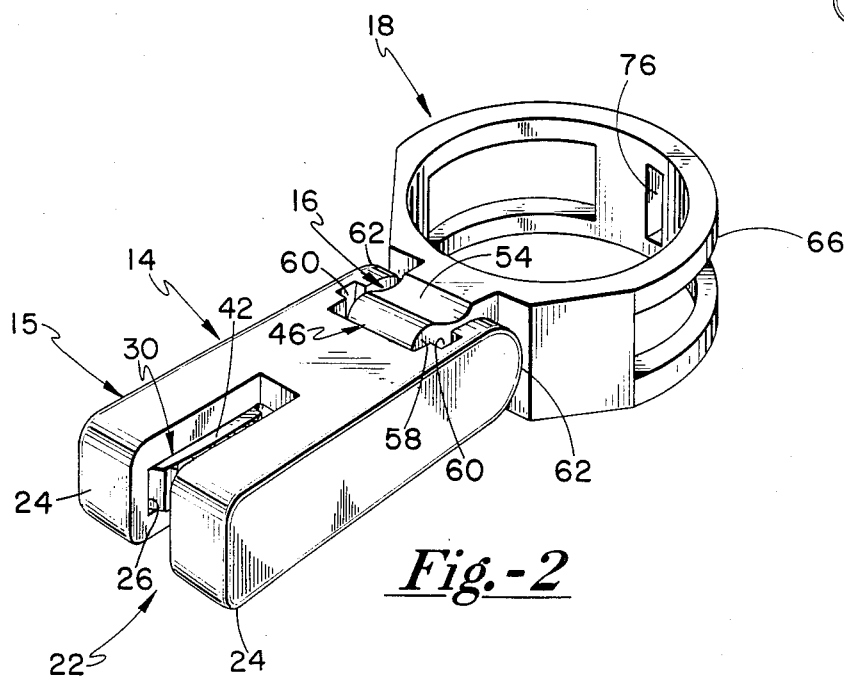
FIG. 2 is a perspective view of the yoke assembly, locking assembly and reel housing, with the locking assembly in the unlocked position.
Figure 3A:
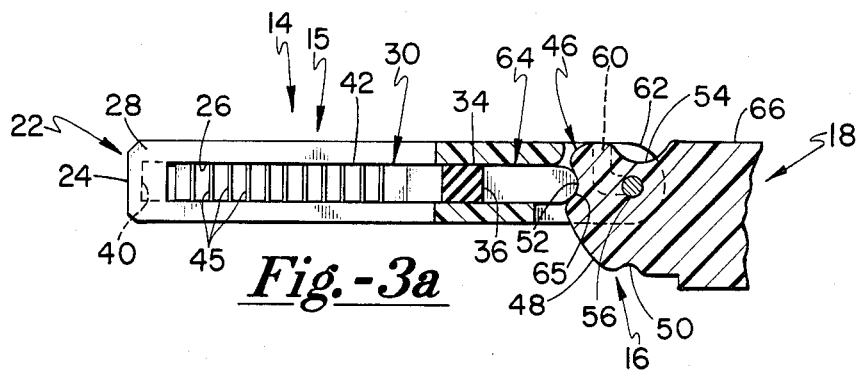
FIG. 3a is a cross sectional view of the yoke assembly and locking assembly taken through line 3—3 of FIG. 2 showing the locking assembly in the locked position.
Figure 3B:
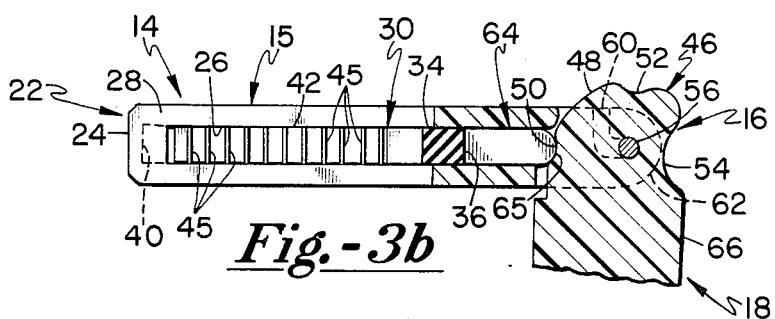
FIG. 3b is a cross sectional view of the yoke assembly and locking assembly taken through line 3—3 of FIG. 2 showing the locking assembly in the unlocked position.
Figure 3C:
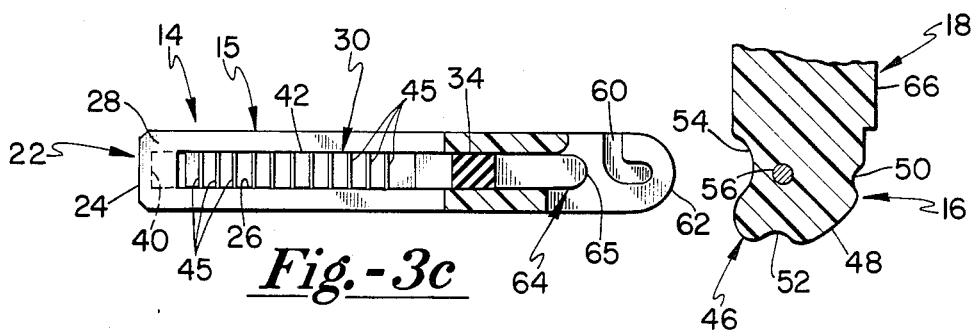
FIG. 3c is a cross sectional view of the yoke assembly and locking assembly taken through line 3—3 of FIG. 2 showing the locking assembly in the release position and the locking assembly disconnected from the yoke assembly.
Figure 4:
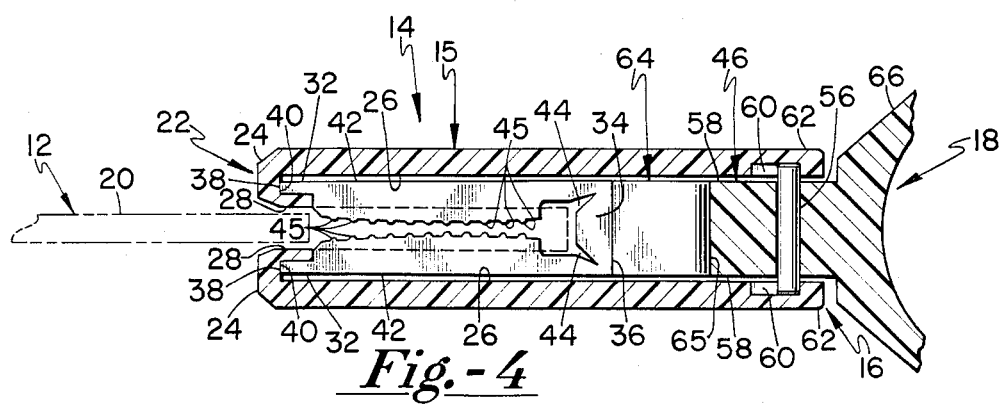
FIG. 4 is a cross sectional view of the yoke assembly and locking assembly from above showing the rubber spring clamp bowed into the mounted position, with the keel and spring clamp in an unbowed position shown in phantom.
Figure 7:
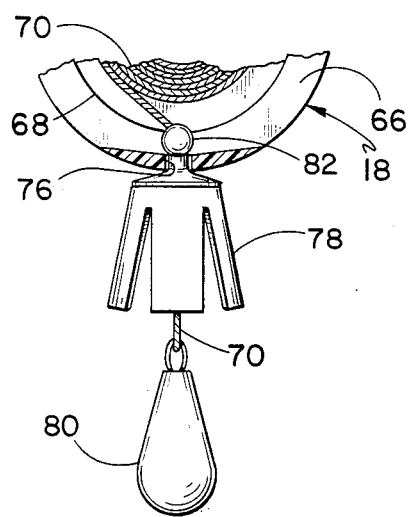
FIG. 7 is a cross sectional view of the reel housing taken through line 7—7 of FIG. 1 showing the nub of the weed guard engaged in the slot of the reel housing.
Figure 5:
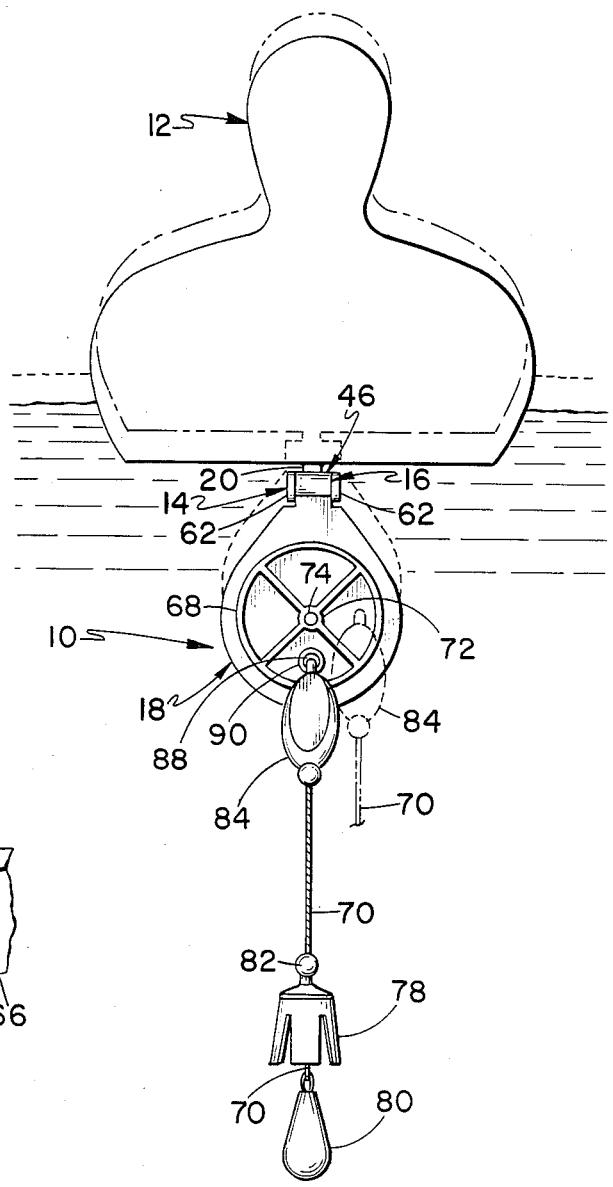
FIG. 5 is an oblique view of a duck decoy and the anchoring mechanism of this invention from the front.
Figure 6A:
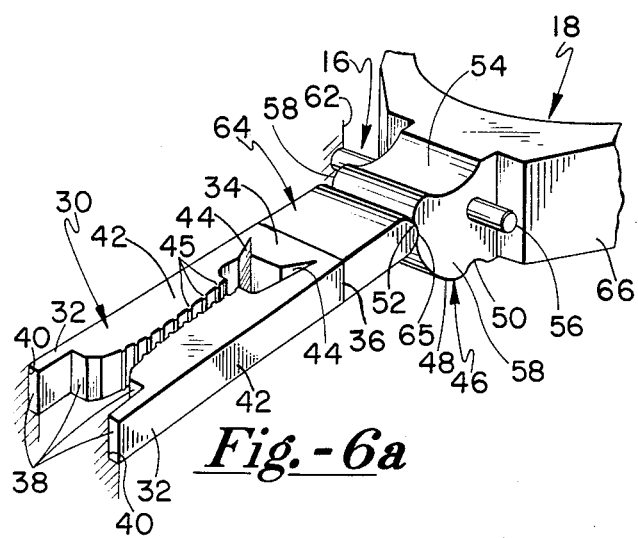
FIG. 6a is a perspective view of the locking assembly and the yoke assembly with the frame removed in the unlocked position.
Figure 6B:
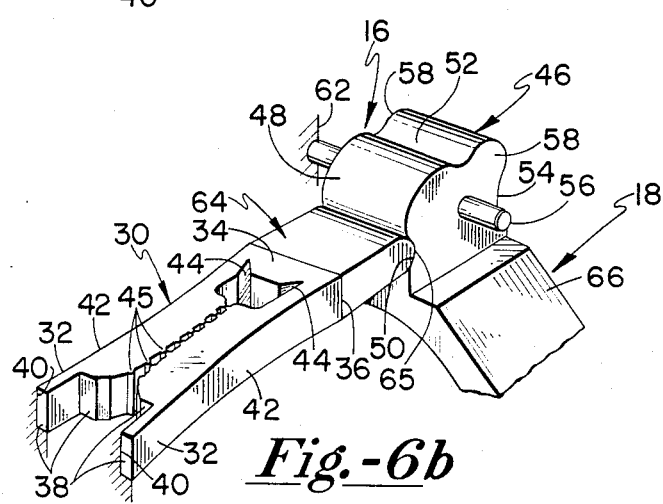
FIG. 6b is a perspective view of the locking assembly and the yoke assembly with the frame removed in the locked position with arrows showing lines of force.

The decoy anchoring mechanism of this invention is referred to generally by numeral 10 as indicated in FIGS. 1 and 5, and is shown in combination with a decoy 12.

The anchoring mechanism 10 has a frame 14, a locking assembly 16, and a reel assembly 18.

The frame 14 includes a yoke assembly 15 which permits the anchoring mechanism 10 to be removably mounted to a keel 20 beneath the decoy 12. The yoke assembly 15 has a bifurcated end 22 with two bracketing extensions 24 set parallel to each other at one end of the frame 14. These bracketing extensions 24 are spaced apart sufficiently to accommodate a portion of the keel 20 therebetween. Each bracketing extension 24 has a cavity or recess 26 on the inner side of the bracketing extension, and these recesses confront one another. A resilient U-shaped rubber spring clamp 30 is contained within the yoke assembly 15, with portions of the spring clamp 30 enclosed in the recesses 26 within the bracketing extensions. The clamp 30 has rubber spring clamp extensions 32 which fit into the bracketing extensions 24 and are joined by a spring clamp bridge 34 at the closed end of the spring clamp 36, the free ends 38 of the spring clamp extensions 32 touching and being confined by end wall sockets 40 of the recesses 26. The spring clamp extensions 32 each have a wider central gripping portion 42 separated from the bridge 34 by a levering notch 44. The surfaces of the spring clamp extensions 32 at the central gripping portions 42 which confront the keel 20 when the keel 20 is positioned between the bracketing extensions 24 may be textured, roughened, or include ribbed protrusions 45 to enhance the gripping contact of the clamp extensions 32 when the keel 20 or clamp extensions 32 are wet.

The locking assembly 16 is composed of a camming block 46 which is molded onto the reel assembly 18. The camming block 46 has a camming surface 48 which defines detents for a locked position 50, an unlocked position 52, and a release position 54, each position being located approximately ninety degrees apart along the camming surface 48. The camming block 46 has a toggle pin 56 extending through and outwardly from opposing sides of the camming extension 58. The toggle pins 56 fit into L-shaped guide tracks 60 in the frame 22 at the end of the yoke assembly opposing the bracketing extensions 62. The camming surface 48 presses against a spacer bar 64 which is set into the recess 26 in the frame 22 of the yoke assembly 14 adjacent the bridge 34 along the frame end of the spring clamp 36. The end of the spacer bar 65 is rounded to conform to the curvature of the detents for the locked position 50, unlocked position 52, and release position 54.

The reel assembly 18 is composed of a reel housing 66 which surrounds a spool 68 of anchoring line 70, with the spool 68 rotatably mounted about its central axis 72 on a spindle 74. The anchoring line is fed out through a slot 76 in the bottom of the reel housing 66, and an anchor shroud 78 and anchor 80 are attached together to the free end of the anchoring line 70. The anchor shroud 78 has a nub 82 at the end opposite the anchor 80 which snaps into the slot 76 in the reel housing 66. The spool 68 is equipped with a weighted handle 84 which is attached to the side of the spool 68 using an axle 86 and ball joint 88. The axle 86 extends slidably through the weighted handle 84 and through the side of the spool 68, and terminates with the ball joint 88. The ball joint is snapped into an axle socket 90 in the side of the spool 68 at a point radially displaced from the central axis 72 of the spool 68, so that the weighted handle 84 may swing freely in relation to the spool 68.

In operation, the bracketing extensions 24 of the yoke assembly 15 are placed on each side of the keel 20, and pressure from the locking assembly 16 is exerted on the frame end of the spring clamp 36. This pressure pushes the free ends 38 of the spring clamp extensions 32 against the sockets 40 of the recesses 26 of the bracketing extensions 24. This pressure bows the spring clamp extensions 38 inwardly toward each other along the central gripping portions 42 until the central gripping portions 42 contact the keel 20. Continues pressure causes the central gripping portions 42 to squeeze the keel 20 and hold the anchoring mechanism 10 in place in its mounted position, with any excess pressure being relieved by the levering notches 44.

The camming extension 46 is positioned so that the release position 52 of the camming surface 48 is directed parallel to the spring clamp extensions 32 and the spacer bar 64. The toggle pins 56 may then be inserted into the L-shaped guide tracks 60. Once inserted, the camming extension 46 is pivoted ninety degress on the toggle pins 56 until the unlocked position 52 of the camming surface 48 is in contact with the spacer bar 64. At this point, the camming block 46 of the locking assembly 16 is held in place within the guide tracks 60 of the frame 22, but the spring clamp 30 remains open. The bracketing extensions 24 of the yoke assembly 14 are placed on either side of the keel 20, and the camming block 46 is rotated another ninety degrees to bring the locked position 50 of the camming surface 48 into contact with the spacer bar 64. In the locked position 50, the camming surface 48 places pressure on the spacer bar 64 which in turn presses against the frame end of the spring clamp 36, providing the force necessary to bend the spring clamp extensions 32 so the central gripping portions 42 contact the keel 20 and hold the anchoring assembly 10 firmly in place. This procedure may be partially reversed to remove the anchoring assembly 10 from the decoy 12, or completely reversed to remove the locking assembly 16 and reel assembly 18 from the yoke assembly 14.

The anchor 80 and anchor shroud 78 are unsnapped from the slot 76, and the decoy 12 and anchoring mechanism 10 are placed in the water. The spool 68 rotates on the spindle 74 to let out anchoring line 70 as the anchor 80 descends towards the lakebed. Once the anchor 80 has settled, the weighted handle 84 prevents more anchoring line 70 from being released.

The anchoring mechanism 10 should be heavy enough so that if a decoy 12 is thrown into the water with the anchoring mechanism 10 attached, the decoy 12 will float in an upright position. The weighted handle 84 should be light enough so that the spool 68 will rotate as the decoy 12 is lifted on the crest of a wave, and heavy enough to pull in the excess anchoring line 70 as the decoy 12 drops into the wave's trough. The proper weights of the anchoring mechanism 10 and handle 84 will vary with the buoyancy, center of mass, and keel depth of the decoy 12. A molded plastic anchoring mechanism 10 with a lead weighted handle 84 in proportion to those generally indicated by FIGS. 1 and 5 has proven satisfatory for various commercial decoys. The minimum diameter of the spool 68 should be at least 2/pi times the distance between a wave crest and trough for any given water condition to ensure that the spool 68 will not play out anchoring line 38 in excess of that required for the anchoring line 70 to extend from the decoy 12 to the lakebed as the decoy 12 rises and falls on the waves.

The anchoring mechanism 10 may be used with flat-bottomed decoys 12 by attaching a keel 14 to the existing decoy 12 with screws or water impervious glue. The reel housing 66 may also be used with other floating articles, such as marker buoys, which are equipped with guide tracks 60 similar to those in the anchoring mechanism 10.

While the preferred embodiments of the present invention have been described, it should be understood that various changes, adaptions and modifications may be made therein without departing from the spirit of the invention and scope of the appended claims.

What is claimed is:

1. An anchoring mechanism usable with a bird hunting decoy with a keel for floating on the surface of a body of water to preserve the function of simulating realistic behavioral characteristics of the decoy due to a rising and falling wave action on the body of water, said anchoring mechanism comprising:

a frame including mounting means capable of removably engaging the keel of the decoy;

a reel assembly carried by said frame and including a spindle and a spool with a central axis of rotation generally parallel to the surface of the body of water, said spool mounted on said spindle to rotate about said central axis;

and anchoring line wrapped on said spool and having a free end;

an anchor fixed to said free end of said anchoring line; and said spool including a weighted handle extending outwardly from a point displaced radially from said central axis of said spool with said handle being carried on said spool and rotatably oscillatable therewith about said spindle subject to the opposing and generally vertically acting forces of anchoring line tension and handle weight as the decoy and said frame rise and fall with the wave action, the weight of said handle being light enough so as to allow the reel to rotate and the anchor line to be played out as the decoy rises due to the wave action and being heavy enough to rotate the reel and rewind the anchor line played out as the decoy falls due to the wave action, thereby avoiding excessive anchor line discharge while permitting the decoy to function with realistic behavioral characteristics on the water without being pulled beneath the water by the weight of the anchor.

2. The anchoring mechanism of claim 1 wherein:

said mounting means has a yoke assembly including a pair of bracketing extensions positionable in engaging proximity to the keel and further including at least one resilient spring clamp carried and confined between bracketing extensions closely confronting the keel, and movable between a locked position in gripping contact with the keel and an unlocked position not in gripping contact with the keel; and said anchoring mechanism further including a locking means carried by said frame and having a camming block for selectively exerting pressure against said spring clamp when said locking means is in said locked position, for deflecting said spring clamp into gripping contact with the keel and locking said clamp against the keel.

3. The anchoring mechanism of claim 2 wherein said spring clamp includes one or more ribbed protrusions thereon confronting and frictionally engagable with the keel when said spring clamp is in said locked position.

4. The anchoring mechanism of claim 2 wherein:

said reel assembly includes at least one pair of toggle pins extending therefrom;

said frame has at least one pair of guide tracks recessed therein and positioned to communicate with said pair of toggle pins, for receiving said toggle pins therein; and said locking means, when in said unlocked position, and being clear of said reel assembly and allowing insertion of said reel assembly toggle pins into said guide tracks, and when in said locked position bearing against said reel assembly to retain said reel assembly to said frame.

5. The anchoring mechanism of claim 2 wherein said yoke assembly and said reel assembly are formed of a plastic-like material.

6. The anchoring mechanism of claim 5 wherein:

said spool defines an axle socket;

said weighted handle includes an axle, a weight slidably retained on said axle, and a ball joint at an end of said axle; and said ball joint is pivotally, movably retained in said axle socket to permit free swinging of said weighted handle relative to said spool during movement of said spool.

7. The anchoring mechanism of claim 6 wherein said locking means further includes a spacer bar slidably mounted to said frame between said spring clamp and said camming surface for transferring pressure from said camming surface to said spring clamp.

8. The anchoring mechanism of claim 7 further comprising:

an anchoring shroud having an outwardly extending nub; and said reel assembly defining a slot to receive and selectively retain said nub therein during storage of the anchoring mechanism.

* * * * *